United States Patent
Yamauchi

(10) Patent No.: US 7,986,444 B2
(45) Date of Patent: Jul. 26, 2011

(54) IMAGE PROCESSING DEVICE, CONTROL METHOD THEREFOR, IMAGE PROCESSING SYSTEM, AND COMPUTER READABLE MEDIUM STORING A PROGRAM

(75) Inventor: Tomonari Yamauchi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 967 days.

(21) Appl. No.: 11/865,174

(22) Filed: Oct. 1, 2007

(65) Prior Publication Data
US 2008/0174830 A1  Jul. 24, 2008

(30) Foreign Application Priority Data
Jan. 22, 2007  (JP) .................. 2007-011373

(51) Int. Cl.
*H04N 1/32*  (2006.01)
*G06K 9/03*  (2006.01)
(52) U.S. Cl. ..................... 358/468; 382/309
(58) Field of Classification Search .......... 358/400, 358/407, 402, 479, 404, 405, 434, 435, 436, 358/438, 439; 379/100.01, 100.09
See application file for complete search history.

(56) References Cited

U.S. PATENT DOCUMENTS

| | | | | |
|---|---|---|---|---|
| 5,291,302 A | * | 3/1994 | Gordon et al. | 358/400 |
| 2006/0139689 A1 | * | 6/2006 | Matsuda | 358/1.15 |
| 2006/0143479 A1 | * | 6/2006 | Morita | 713/193 |
| 2008/0068638 A1 | * | 3/2008 | Yagi | 358/1.14 |
| 2008/0169909 A1 | * | 7/2008 | Park et al. | 340/10.4 |
| 2008/0266411 A1 | * | 10/2008 | Crinon et al. | 348/222.1 |
| 2008/0300996 A1 | * | 12/2008 | Fei et al. | 705/26 |

FOREIGN PATENT DOCUMENTS

JP    2002-278738 A    9/2002

* cited by examiner

*Primary Examiner* — Jerome Grant, II
(74) *Attorney, Agent, or Firm* — Sughrue Mion, PLLC

(57) ABSTRACT

Provided is an image processing device (2), which accepts an input of a processing condition input by a user, executes image processing based on the accepted processing condition, transmits, when a failure occurs during the image processing, re-input request information for requesting a re-input of the processing condition to an information terminal (4), receives processing condition designation information designating the processing condition that has been re-input, from the information terminal (4), and re-executes the image processing based on the processing condition designated by the processing condition designation information.

8 Claims, 4 Drawing Sheets

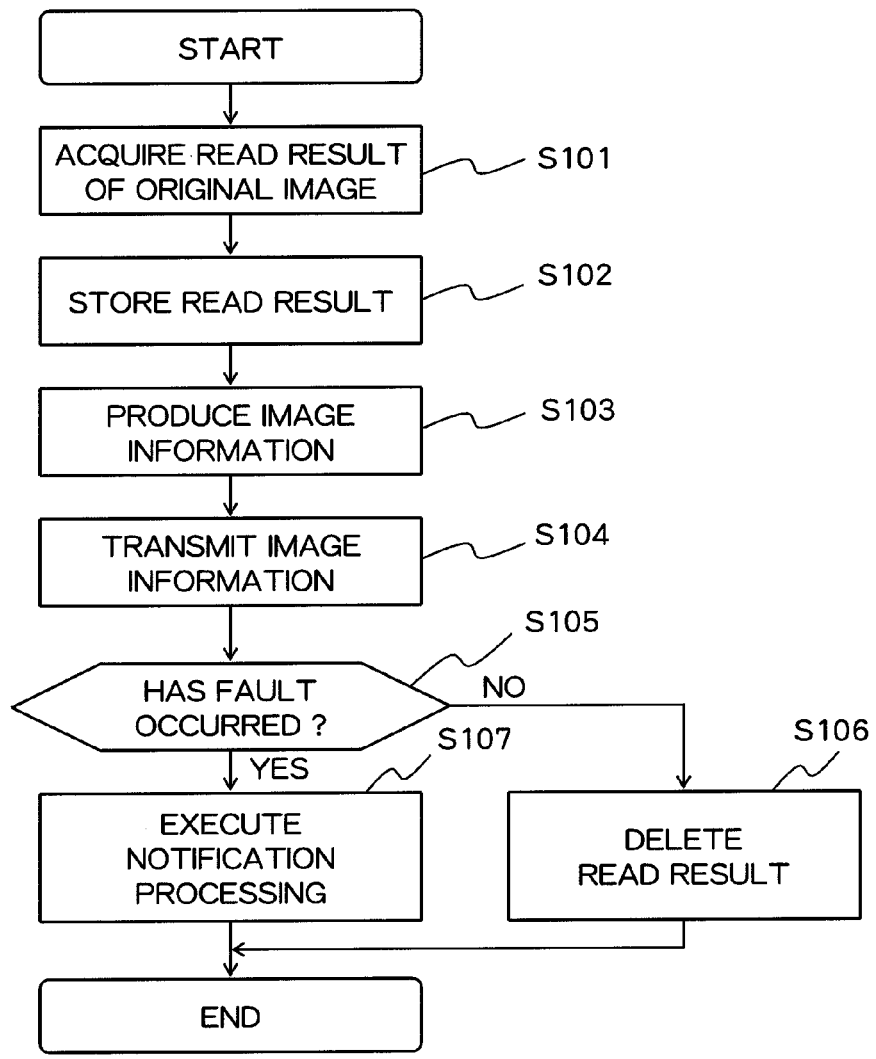

Subject: FAX TRANSMISSION HAS FAILED.
  Date: Fri, 1 Jan 2007 13:00:00
  From: <alert@alert.com>
   To: <XXX@xxx.xx.co.jp>

THE JOB EXECUTED ON JANUARY 1, 2007 HAS FAILED. PLEASE ACCESS THE FOLLOWING URL AND RE-INPUT THE TRANSMISSION CONDITION.
http://www.alert.com/alert/errorXXXXX.html

(12) United States Patent
US 7,986,444 B2

IMAGE PROCESSING DEVICE, CONTROL METHOD THEREFOR, IMAGE PROCESSING SYSTEM, AND COMPUTER READABLE MEDIUM STORING A PROGRAM

CROSS-REFERENCE TO RELATED APPLICATIONS

This application is based on and claims priority under 35 U.S.C. 119 from Japanese Patent Application No. 2007-011373 Filed on Jan. 22, 2007.

BACKGROUND

1. Technical Field

The present invention relates to an image processing device, a control method therefor, an image processing system, and a computer readable medium storing a program.

2. Related Art

There is known a system that allows information on a countermeasure for a failure that has occurred in an image processing device to be viewed on an information terminal of a user via a network.

SUMMARY

An object of the present invention is to provide an image processing device, an image processing system, and a program that allow, when a failure occurs during image processing executed based on processing conditions input by a user, the image processing to be re-executed by re-inputting the processing conditions by the user to a device which is located away from and is different from the image processing device in which the failure has occurred.

According to an aspect of the present invention, there is provided an image processing device including: an input accepting unit that accepts an input of a processing condition by a user; a processing unit that executes image processing based on the processing condition accepted by the input accepting unit; a re-input request information transmission unit that transmits, when a failure occurs during the image processing executed by the processing unit, re-input request information for requesting a re-input of the processing condition to an external device; a processing condition designation information receiving unit that receives processing condition designation information designating the processing condition that has been re-input, from the external device; and a re-execution unit that causes the processing unit to re-execute the image processing based on the processing condition designated by the processing condition designation information.

BRIEF DESCRIPTION OF THE DRAWINGS

An exemplary embodiment of the present invention will be described in detail based on the following figures, wherein:

FIG. 3 is a flowchart showing an example of processing executed by the image processing device according to the exemplary embodiment of the present invention;

FIG. 4 is a diagram showing an example of information stored in the image processing device according to the exemplary embodiment of the present invention;

DETAILED DESCRIPTION

Figure 1:
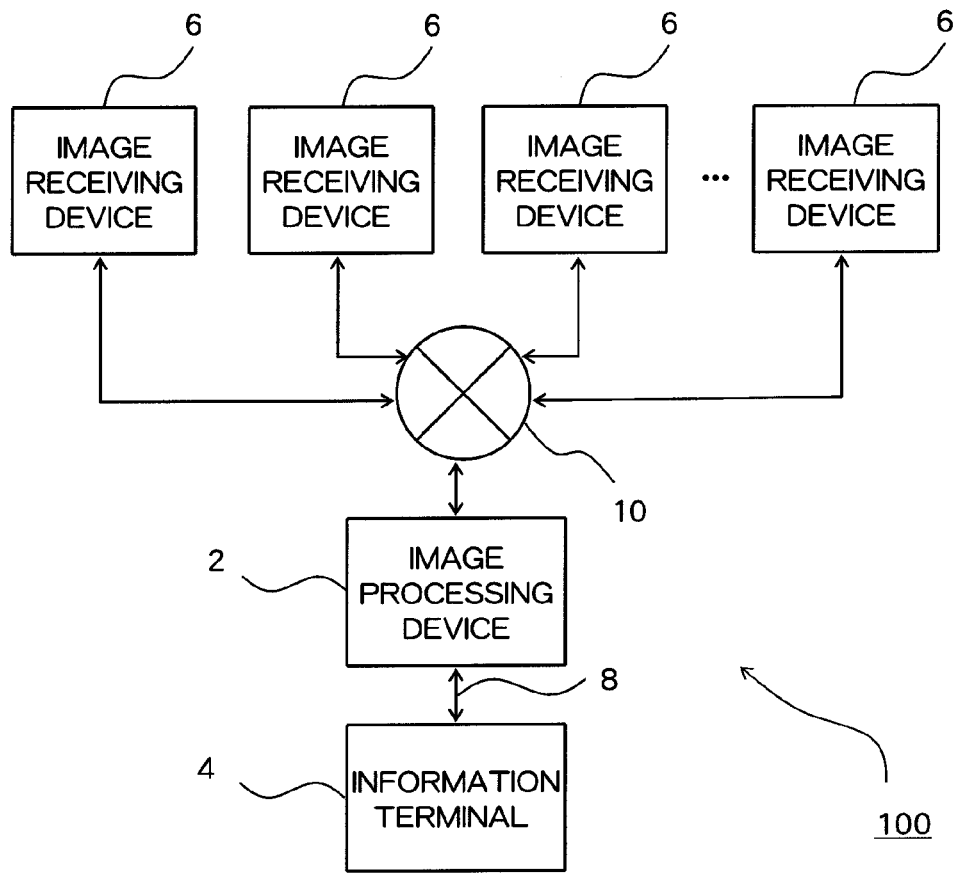
FIG. 1 is a diagram showing an example of a structure of an image transmission system including an image processing device according to an exemplary embodiment of the present invention.

An exemplary embodiment of the present invention will be described with reference to the drawings. FIG. 1 is an example of a structural diagram of an image transmission system 100 according to the exemplary embodiment of the present invention. As shown in the figure, the image transmission system 100 includes an image processing device 2, a user information terminal 4, and at least one image receiving device 6. The image processing device 2 and the information terminal 4 are communicably connected to each other via a local area network 8, for example. In addition, the image processing device 2 and the image receiving device 6 are communicably connected to each other via a network 10. Here, a telephone line, the Internet, a local area network, or the like is used as the network 10. In this exemplary embodiment, the network 10 is the telephone line.

Figure 2:
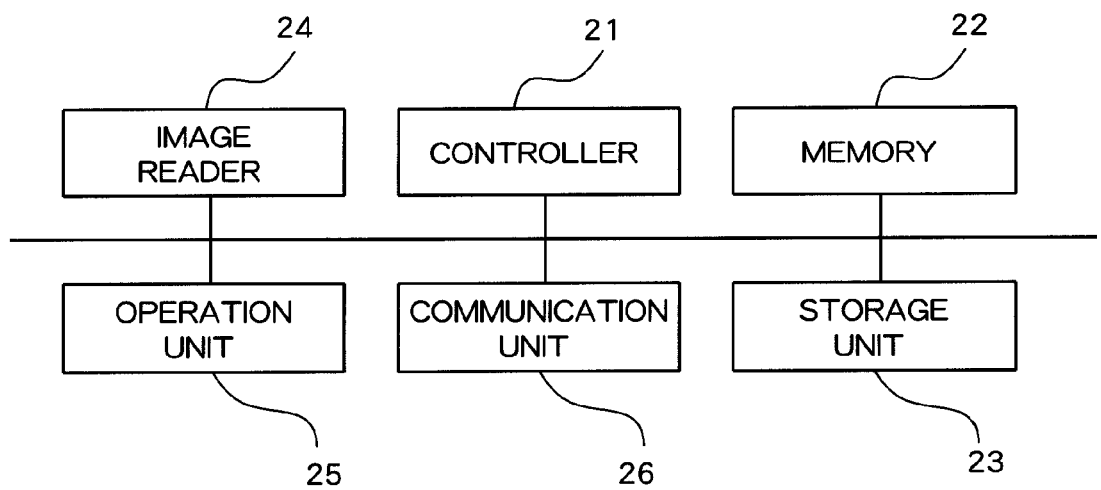
FIG. 2 is a diagram showing an example of a structural block diagram of the image processing device according to the exemplary embodiment of the present invention.

Next, each of the devices will be described in detail. The image processing device 2 is realized as a multifunctional machine provided with an image reading function and a facsimile function, for example. FIG. 2 is an example of a structural block diagram of the image processing device 2. As shown in the figure, the image processing device 2 includes a controller 21, a memory 22, a storage unit 23, an image reader 24, an operation unit 25, and a communication unit 26. Further, the units are communicable via a bus. Note that the image processing device 2 includes an image forming unit or the like (not shown) in addition to the units described above.

Hereinafter, each of the units will be described. A CPU or the like is used as the controller 21. The controller 21 operates in accordance with a program stored in the memory 22. Processing executed by the controller 21 will be described later in detail.

A RAM, a ROM, or the like is used as the memory 22. The memory 22 stores the program executed by the controller 21. Further, the memory 22 also operates as a work memory for holding various types of information required for execution of processing by the controller 21. Note that the program may be supplied from an information storage medium such as a CD-ROM, a DVD-ROM, and the like, or may be supplied via a communication medium (e.g., medium for temporarily holding or carrying a program, such as a communication line or a communication system).

Further, a hard disk or the like is used as the storage unit 23. The storage unit 23 stores various types of information. An image scanner, for example, is used as the image reader 24. The image reader 24 reads an original image of an original according to an instruction from the controller 21 and outputs the read result to the memory 22. Note that the read result is expressed as bitmap information.

The operation unit 25 is realized as a touch panel provided on a side surface of the image processing device 2, for example. The operation unit 25 also functions as a display for displaying input information.

A modem or a network interface card, for example, is used as the communication unit 26. The communication unit 26 receives information via the local area network 8 or the network 10. Further, the communication unit 26 transmits information via the local area network 8 or the network 10. Note that when information is transmitted via the network 10, the communication unit 26 modulates the information from a digital signal to an analog signal. In addition, when information is received via the network 10, the communication unit 26 demodulates the information from the analog signal to the digital signal. The descriptions above are details of each of the units of the image processing device 2.

A personal computer of a user provided at the same location as the image processing device 2 (e.g., in the same building), for example, is used as the information terminal 4. The information terminal 4 displays information received from the image processing device 2 via the local area network 8 on a display. Further, the information terminal 4 transmits various types of information to the image processing device 2 via the local area network 8. Note that a portable terminal such as a cellular phone or the like may be used as the information terminal 4.

A facsimile or a multifunctional machine provided at a location different from that of the image processing device 2 and the information terminal 4, for example, is used as the image receiving device 6. Upon reception of image information via the network 10, the image receiving device 6 forms and outputs an image expressed by the image information on a paper medium. The descriptions above are details of each of the devices.

Next, processing executed by the controller 21 of the image processing device 2 will be described. Here, a description will be given of a case where the user causes an original image to be read by the image processing device 2 and the original image is transmitted to the image receiving device 6 using the facsimile function.

In this case, the user places an original at a predetermined position of the image reader 24. Then, the user inputs transmission conditions using the touch panel and instructs transmission of the original image. The transmission conditions are conditions for transmitting the original image. The transmission conditions include, for example, an address of a transmission destination of the original image (i.e., phone number of the transmission destination), resolution in transmitting the original image, an image size in transmitting the original image, and a color mode in transmitting the original image (i.e., which mode of color, grayscale, and monochrome the original image is to be transmitted in). In this exemplary embodiment, the user inputs the phone number of the transmission destination, the resolution, the image size, and the color mode as the transmission conditions. In particular, the user selects a desired resolution, image size, and color mode of the original image from predetermined candidates.

The operation unit 25 accepts the transmission conditions input by the user and a transmission instruction of the original image. Then, the controller 21 executes processing shown in the flowchart of FIG. 3 based on the information accepted by the operation unit 25, for example.

In other words, the controller 21 causes the image reader 24 to read the original image and to acquire the read result (S101). Then, the controller 21 causes the memory 22 to store the read result acquired in Step S101 in correlation with a job ID for uniquely identifying the read result (S102). In addition, the controller 21 also causes the memory 22 to store the read result stored in Step S102 in correlation with the transmission conditions (i.e., phone number of the transmission destination, resolution, image size, and color mode) that have been accepted by the operation unit 25 (see FIG. 4).

Then, the controller 21 converts the read result acquired in Step S101 in accordance with the transmission conditions accepted by the operation unit 25, to thereby produce image information of the original image (S103). Specifically, the controller 21 produces the image information of the original image as bitmap information in the resolution, the image size, and the color mode accepted by the operation unit 25, by converting the read result.

After that, the controller 21 transmits the image information produced in Step S103 to the image receiving device 6 having the phone number that has been accepted by the operation unit 25 via the network 10 (S104). In other words, the controller 21 transmits the image information after establishing a connection with the image receiving device 6 by dialing the phone number that has been accepted by the operation unit 25.

The controller 21 judges whether transmission of the image information of Step S104 has been completed normally (S105). For example, when the communication unit 26 receives a predetermined signal indicating that reception of the image information has been completed (hereinafter, will be referred to as "completion signal")), the controller 21 judges that the transmission of the image information has been completed normally. On the other hand, when a completion signal is not received by the communication unit 26 within a predetermined time or when the communication unit 26 receives a predetermined fault signal different from the completion signal, the controller 21 judges that a fault has occurred during the transmission of the image information. Examples of the fault signal include a signal indicating a busy status of a dialed number and a signal indicating that the information receiving device 26 at the dialed number cannot receive image information. Further, also when the transmission of the image information is suspended because an information amount of the image information has exceeded a predetermined threshold, for example, the controller 21 may judge that a fault has occurred during the transmission of the image information.

When it is judged that the transmission of the image information has been completed normally (NO in Step S105), the controller 21 deletes the read result stored in the memory 22 in Step S102 (S106) and ends the processing.

Incidentally, a time required for reading an original image is generally shorter than a time required for transmitting image information. Accordingly, when the user uses the image processing device 2, there is a case where the user moves away from the image processing device 2 upon completion of reading of the original image, without waiting for completion of the transmission of the original image. In this case, the user is not only unaware that a fault has occurred during the transmission of the image information, but also needs to take the original to the image processing device 2 again to re-instruct reading and transmission of the original image even if the user has noticed the occurrence of the fault. Thus, when it is judged that a fault has occurred during the transmission of the image information (YES in Step S105), the controller 21 executes processing of Step S107 described below.

In other words, the controller 21 executes processing for notifying the user of an occurrence of a fault (S107). Here, the controller 21 transmits an email for notifying an occurrence of a fault to the user information terminal 4. In this case, a mail address of the user may be input by the user at a time of input of the transmission conditions, or may be a predetermined mail address. Note that in Step S107, the controller 21 produces an HTML document uniquely corresponding to the job ID stored in Step S102, and stores the produced document in the storage unit 23. Here, the controller 21 determines in advance a name of the HTML document such that the name includes a character string of the job ID. The descriptions above are details of the processing shown in the flowchart of FIG. 3.

Figures 5, 6:
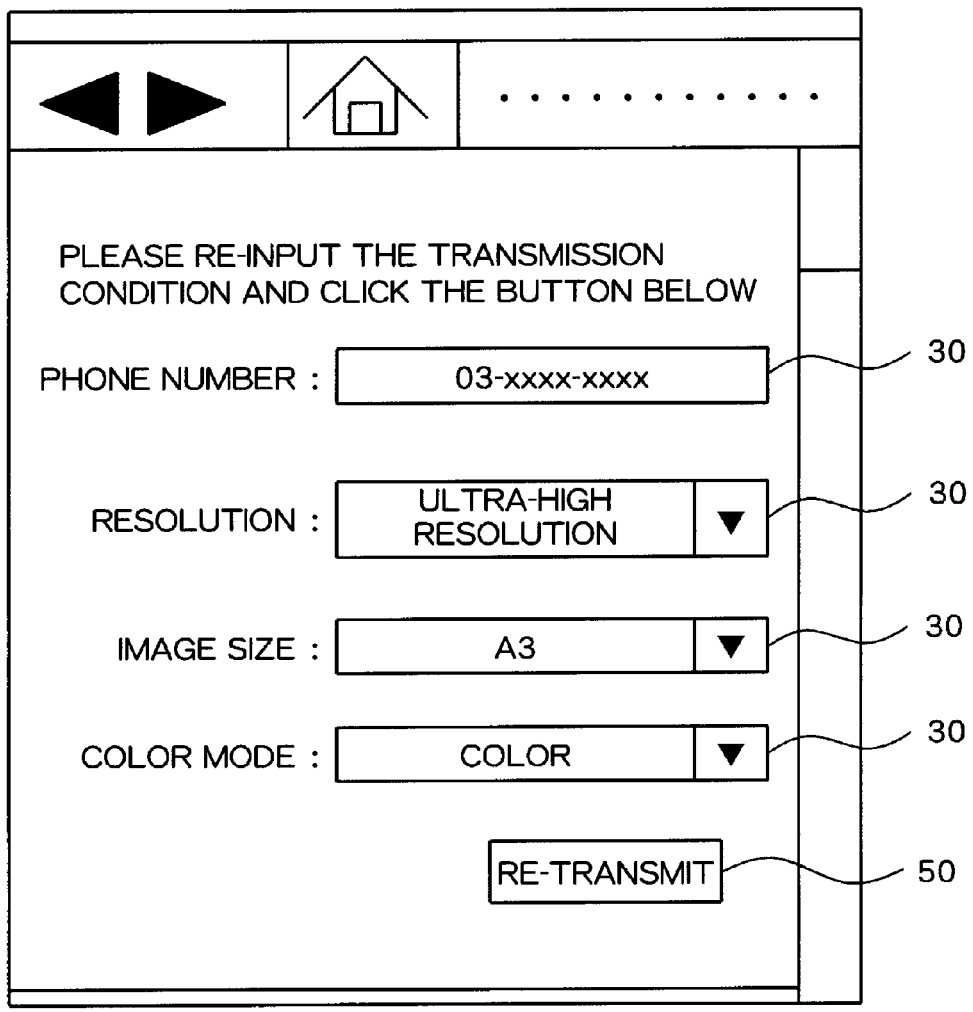
FIG. 5 is a diagram showing an example of an email transmitted from the image processing device according to the exemplary embodiment of the present invention.
FIG. 6 is a diagram showing an example of an interface that is displayed on an information terminal according to the exemplary embodiment of the present invention.

FIG. 5 is an example of the email. As shown in the figure, the email includes sentences for notifying the user of the occurrence of the fault as well as prompting the user to re-input the transmission conditions, and a URL of the HTML document. For re-input of the transmission conditions upon recognizing the occurrence of the fault by the email, the user accesses the URL by using a web browser, for example.

The controller 21 monitors whether a transmission request of the HTML document has been received by the communication unit 26. When the transmission request of the HTML document has been received by the communication unit 26, the controller 21 sends back the HTML document to a request source. Note that the controller 21 also specifies the job ID included in the name of the HTML document and reads the transmission conditions correlated with the job ID out of the memory 22 to transmit the transmission conditions to the request source.

FIG. 6 is an example of an interface displayed on the display of the information terminal 4 that has received the HTML document. As shown in the figure, the interface includes input areas 30 for re-inputting the transmission conditions, and an instruction button 50. In addition, the transmission conditions received with the HTML document are input in advance to the respective input areas 30. When there is an error in a transmission condition input in advance to a certain input area 30, for example, the user corrects the input transmission condition. Then, upon completion of the re-input of the transmission condition, the user clicks the instruction button 50. After that, the information terminal 4 transmits transmission condition designation information containing the transmission conditions input to the input areas 30 to the image processing device 2. Note that the information terminal 4 also transmits the job ID included in the name of the HTML document in addition to the transmission condition designation information.

Figure 7:
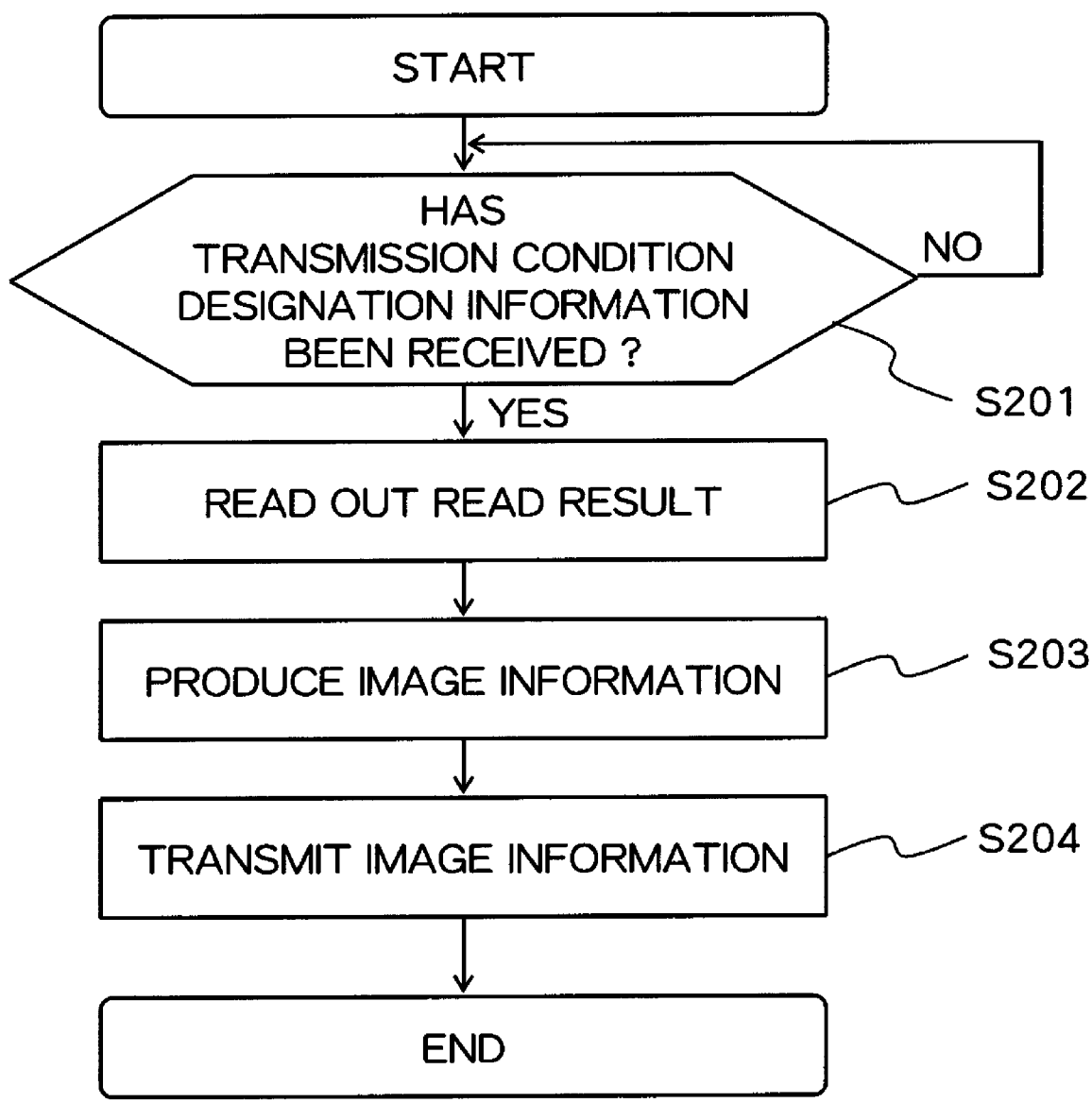
FIG. 7 is a flowchart showing an example of processing executed by the image processing device according to the exemplary embodiment of the present invention.

Referring to the flowchart of FIG. 7, a description will be given of processing executed in a case where the controller 21 has received the transmission condition designation information. The controller 21 monitors whether transmission condition designation information has been received by the communication unit 26 (S201). When the transmission condition designation information has been received by the communication unit 26 (YES in Step S201), the controller 21 reads out of the memory 22 a read result correlated with a job ID received together with the transmission condition designation information by the communication unit 26 (S202).

After that, the controller 21 produces image information of an original image by converting the read result read out in Step S202 in accordance with transmission conditions contained in the transmission condition designation information (S203). Specifically, by converting the read result, the controller 21 produces the image information of the original image as bitmap information in a resolution, image size, and color mode contained in the transmission condition designation information.

Subsequently, the controller 21 transmits the image information produced in Step S203 to the image receiving device 6 whose phone number matches the phone number contained in the transmission condition designation information (S204). In other words, the controller 21 transmits the image information after establishing a connection with the image receiving device 6 by dialing the phone number contained in the transmission condition designation information. The descriptions above are details of the processing shown in the flowchart of FIG. 7.

As described above, in the image transmission system 100, the image processing device 2 reads the original image and acquires the read result. Further, the image processing device 2 produces the image information expressing the original image by converting the read result based on the transmission conditions input by the user. Further, in addition to the generation of the image information, the image processing device 2 transmits the produced image information to the image receiving device 6 designated based on one of the transmission conditions input by the user. Then, when a fault occurs during transmission of the image information, the image processing device 2 transmits an email for notifying the occurrence of the fault to the user information terminal 4. After that, upon reception of a request from the user information terminal 4, the image processing device 2 sends back an HTML document for providing an interface for prompting the user of the information terminal 4 to re-input the transmission conditions. Then, the image processing device 2 receives the transmission conditions that have been re-input by the user from the information terminal 4, and re-executes the generation and transmission of the image information.

Note that application of the present invention is not restricted to this exemplary embodiment.

For example, in the above exemplary embodiment, as can be seen from FIG. 6, the controller 21 constructs the HTML document so that all the transmission conditions input by the user using the operation unit 25, that is, transmission conditions directly input to the image processing device 2 by the user, can be re-input. Accordingly, the user can re-input all the transmission conditions that have been directly input. However, the controller 21 need not necessarily construct the HTML document so that all the transmission conditions that have been directly input can be re-input. For example, when a fault occurs during the transmission of the image information, the controller 21 may identify a type of the fault and construct the HTML document so that re-input of the transmission conditions, which corresponds to the identified type of the fault, becomes possible.

Specifically, transmission conditions that can be re-input are determined in advance for each fault signal. When a fault signal is received by the communication unit 26 in Step S105, the controller 21 specifies the transmission conditions that can be re-input, which have been determined in advance for the fault signal, and constructs the HTML document so that only the specified transmission conditions can be re-input in Step S107. In this case, the user can re-input only the specified transmission conditions. Therefore, the transmission condition designation information contains only the transmission conditions re-input based on the specified transmission conditions. Thus, the controller 21 produces and transmits the image information based on the transmission conditions contained in the transmission condition designation information and the transmission conditions stored in the memory 22 in the processing shown in the flowchart of FIG. 7.

For example, when a device on a receiving side does not support the image size of the original image expressed by the image information, when a memory capacity of the device on the receiving side becomes full due to an excess amount of image information, or when the device on the receiving side does not support the color mode of the original image expressed by the image information, the device on the receiving side cannot receive the image information. In this case, by changing the image size or the color mode of the original image expressed by the image information so as to correspond to the device on the receiving side, or by lowering the resolution so as to reduce the information amount of the image information, the possibility of the transmission of the image information being completed normally becomes high. Thus, the transmission conditions that can be re-input with respect to the fault signal indicating that the image information cannot be received are determined in advance to be the image size, the resolution, and the color mode. Further, when the communication unit 26 receives the same fault signal in Step S105, the controller 21 specifies the transmission conditions (i.e., image size, resolution, and color mode) that can be re-input, which have been determined in advance for the fault signal, and constructs the HTML document so that the image size, the resolution, and the color mode can be re-input in Step S107. Then, in Step S203, the controller 21 produces image information based on the re-input resolution, image size, and color mode contained in the transmission condition designation information. After that, in Step S204, the controller 21 transmits the image information produced in Step S203 to the image receiving device 6 whose phone number matches the phone number stored in the memory 22.

In addition, in the above exemplary embodiment, for prompting the user to re-input the transmission conditions, the controller 21 transmits to the information terminal 4 the HTML document for providing the interface shown in FIG. 6, which corresponds to the URL contained in the email. However, for prompting the user to re-input the transmission conditions, the controller 21 may transmit to the information terminal 4 an email to which a so-called electronic form has been attached.

Further, in the above exemplary embodiment, the user re-inputs the transmission conditions to the information terminal 4. However, the re-input of the transmission conditions may also be carried out in the image processing device 2.

Further, in the above exemplary embodiment, the transmission conditions are set to the phone number of the transmission destination, the resolution, the image size, and the color mode of the original image. However, the present invention is not limited thereto. For example, the user may input a communication format at a time of transmitting image information as the transmission condition. For example, the user may select one communication format from a G3 format, a G4 format, and an Internet FAX format.

Further, for example, the image processing device 2 according to the present invention can be realized as a network scanner or a multifunctional machine for registering image information in an information system, such as a file server or the like, via communication means such as a TCP/IP communication network or the like.

In other words, when a fault occurs in registration of the image information, the image processing device 2 may prompt the user to re-input to the user information terminal 4 at least one of registration destination information (e.g., folder path including an IP address of the file server) of the image information input by the user and log-in information (log-in ID and password) for the file server.

For example, upon reception of information indicating a log-in failure from the file server, the image processing device 2 may transmit an email which notifies to that effect to the user information terminal 4. Then, the image processing device 2 may transmit an HTML document for displaying the interface through which log-in information can be re-input, to the user information terminal 4.

Further, for example, upon reception of information indicating that there is no folder indicated by the registration destination information from the file server, the image processing device 2 may transmit an email which notifies to that effect to the user information terminal 4. Then, the image processing device 2 may transmit an HTML document for displaying the interface through which the registration destination information can be re-input, to the user information terminal 4.

What is claimed is:

1. An image processing device, comprising:
    an input accepting unit that accepts an input of processing conditions input by a user;
    a processing unit that executes image processing based on the processing conditions accepted by the input accepting unit;
    a re-input request information transmission unit that, in response to a failure occurring during the image processing executed by the processing unit, identifies a type of the failure and transmits to an external device processing conditions corresponding to the identified type of the failure that have been accepted by the input accepting unit and re-input request information for requesting a re-input of the processing conditions corresponding to the identified type of the failure, wherein the re-input request information comprises a document for accepting the re-input of the processing conditions corresponding to the identified type of the failure;
    a processing condition designation information receiving unit that receives from the external device processing condition designation information designating processing conditions that have been re-input; and
    a re-execution unit that causes the processing unit to re-execute the image processing based on the processing conditions designated by the processing condition designation information.

2. The image processing device according to claim 1, wherein:
    the input accepting unit accepts an input of transmission destination designation information that designates the external device as a transmission destination of the re-input request information, as well as the processing conditions; and
    the re-input request information transmission unit transmits the re-input request information to the external device designated by the transmission destination designation information.

3. The image processing device according to claim 1, wherein the re-input request information transmission unit transmits the re-input request information incorporating the processing conditions accepted by the input accepting unit.

4. The image processing device according to claim 1, further comprising an image information generating unit that reads an original image recorded on an original to produce image information expressing the original image, wherein:
    the input accepting unit accepts as one of the processing conditions an input of image transmission destination designation information that designates a transmission destination of the image information;
    the processing unit transmits the image information to the transmission destination designated by the image transmission destination designation information;
    the re-input request information transmission unit, in response to a failure occurring during the transmission of the image information by the processing unit, transmits the re-input request information to the external device; and
    the re-execution unit, in response to the transmission destination of the image information being designated by the processing condition designation information, causes the processing unit to re-transmit the image information to the transmission destination designated by the processing condition designation information.

5. The image processing device according to claim 4, wherein:
the input accepting unit accepts an input of conversion format designation information that designates a conversion format of the image information as one of the processing conditions;
the processing unit transmits the image information after converting a format of the image information into a conversion format designated by the conversion format designation information; and
the re-execution unit, in response to the conversion format of the image information being designated by the processing condition designation information, causes the processing unit to re-transmit the image information after converting the format of the image information into the conversion format designated by the processing condition designation information.

6. An image processing system, comprising:
an image processing device; and
an information terminal,
the image processing device including:
an input accepting unit that accepts an input of processing conditions input by a user;
a processing unit that executes image processing based on the processing conditions accepted by the input accepting unit;
a re-input request information transmission unit that, in response to a failure occurring during the image processing executed by the processing unit, identifies a type of the failure and transmits to the information terminal processing conditions corresponding to the identified type of the failure which have been accepted by the input accepting unit and re-input request information for requesting a re-input of the processing conditions corresponding to the identified type of the failure, wherein the re-input request information comprises a document for accepting the re-input of the processing conditions corresponding to the identified type of the failure;
a processing condition designation information receiving unit that receives from the information terminal processing condition designation information designating processing conditions that have been re-input; and
a re-execution unit that causes the processing unit to re-execute the image processing based on the processing conditions designated by the processing condition designation information; and
the information terminal including:
a re-input request information receiving unit that receives the re-input request information;
a processing condition input accepting unit that accepts the input of processing conditions based on the re-input request information that has been received by the re-input request information receiving unit; and
a processing condition designation information transmission unit that transmits to the image processing device the processing condition designation information designating the processing conditions that have been accepted by the processing condition input accepting unit.

7. A computer readable medium storing a program that causes a computer to execute a process comprising:
accepting an input of processing conditions input by a user;
executing image processing based on the accepted processing conditions;
identifying, in response to a failure occurring in the execution of the image processing, a type of the failure;
transmitting to an external device processing conditions corresponding to the identified type of the failure and re-input request information for requesting a re-input of processing conditions corresponding to the identified type of the failure, wherein the re-input request information comprises a document for accepting the re-input of the processing conditions corresponding to the identified type of the failure;
receiving from the external device processing condition designation information designating processing conditions that have been re-input; and
re-executing the image processing based on the processing conditions designated by the processing condition designation information.

8. A control method for an image processing device, comprising:
accepting an input of processing conditions input by a user;
executing image processing based on the accepted processing conditions;
identifying, in response to a failure occurring in the execution of the image processing, a type of the failure;
transmitting to an external device processing conditions corresponding to the identified type of the failure and re-input request information for requesting a re-input of processing conditions corresponding to the identified type of the failure, wherein the re-input request information comprises a document for accepting the re-input of the processing conditions corresponding to the identified type of the failure;
receiving from the external device processing condition designation information designating processing conditions that have been re-input; and
re-executing the image processing based on the processing conditions designated by the processing condition designation information.

* * * * *